United States Patent
Peter et al.

(10) Patent No.: US 9,644,502 B2
(45) Date of Patent: May 9, 2017

(54) REGENERATIVE THERMODYNAMIC POWER GENERATION CYCLE SYSTEMS, AND METHODS FOR OPERATING THEREOF

(71) Applicant: General Electric Company, Schenectady, NY (US)

(72) Inventors: Andrew Maxwell Peter, Saratoga Springs, NY (US); Chiranjeev Singh Kalra, Niskayuna, NY (US); Douglas Carl Hofer, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 147 days.

(21) Appl. No.: 14/682,421

(22) Filed: Apr. 9, 2015

(65) Prior Publication Data
US 2016/0298500 A1    Oct. 13, 2016

(51) Int. Cl.
*F01K 25/10*    (2006.01)
*F02C 1/10*    (2006.01)
(Continued)

(52) U.S. Cl.
CPC .............. *F01K 25/103* (2013.01); *F01K 5/00* (2013.01); *F01K 7/32* (2013.01); *F02C 1/10* (2013.01); *F04D 25/04* (2013.01)

(58) Field of Classification Search
CPC ........ F04D 25/02; F04D 25/024; F04D 25/04; F04D 25/045; F01K 25/103; F01K 7/32;
(Continued)

(56) References Cited

U.S. PATENT DOCUMENTS 3,971,211 A * 7/1976 Wethe ....................... F01K 7/32
                                                    60/39.181
4,498,289 A * 2/1985 Osgerby ............... F01K 25/103
                                                    60/39.17
(Continued)

FOREIGN PATENT DOCUMENTS

CN    203614227 U    5/2014

OTHER PUBLICATIONS

Moisseytsev et al., "Investigation of alternative layouts for the supercritical carbon dioxide Brayton cycle for a sodium-cooled fast reactor", Nuclear Engineering and Design, Science direct, vol. 239, Issue 7, 2009, pp. 1362-1371.

(Continued)

*Primary Examiner* — Mark Laurenzi
*Assistant Examiner* — Xiaoting Hu
(74) *Attorney, Agent, or Firm* — Jason K. Klindtworth

(57) ABSTRACT

A regenerative closed loop thermodynamic power generation cycle system is presented. The system includes a high-pressure expander to deliver an exhaust stream. A conduit is fluidly coupled to the high-pressure expander, which is configured to split the exhaust stream from the high-pressure expander into a first exhaust stream and a second exhaust stream. The system further includes a first low-pressure expander and a second low-pressure expander. The first low-pressure expander is coupled to a pressurization device through a turbocompressor shaft, and fluidly coupled to receive the first exhaust stream. The second low-pressure expander is coupled to the high-pressure expander and an electrical generator through a turbogenerator shaft, and fluidly coupled to receive the second exhaust stream. A method for operating the regenerative closed loop thermodynamic power generation cycle system is also presented.

18 Claims, 2 Drawing Sheets

(51) Int. Cl.
*F01K 7/32* (2006.01)
*F04D 25/04* (2006.01)
*F01K 5/00* (2006.01)

(58) Field of Classification Search
CPC .. F01K 13/00; F01K 25/10; F02C 1/10; F02C 1/04; F02C 1/02
USPC .................................. 60/650, 682–684, 659
See application file for complete search history.

(56) References Cited

U.S. PATENT DOCUMENTS

| | | | |
|---|---|---|---|
| 8,490,397 B2 | 7/2013 | Lehar | |
| 8,752,382 B2 | 6/2014 | Lehar | |
| 9,388,817 B1* | 7/2016 | Wright | F02B 39/10 |
| 2010/0024421 A1* | 2/2010 | Litwin | F02C 1/05 |
| | | | 60/641.8 |
| 2010/0242429 A1 | 9/2010 | Smith | |
| 2011/0011088 A1* | 1/2011 | Iijima | B01D 53/1412 |
| | | | 60/645 |
| 2012/0131920 A1* | 5/2012 | Held | F01K 13/02 |
| | | | 60/650 |
| 2012/0216536 A1* | 8/2012 | Ma | F03G 6/00 |
| | | | 60/641.8 |
| 2013/0033044 A1 | 2/2013 | Wright et al. | |
| 2013/0145759 A1* | 6/2013 | Sonwane | F22B 35/086 |
| | | | 60/526 |
| 2013/0180259 A1* | 7/2013 | Stapp | F02C 3/04 |
| | | | 60/773 |
| 2015/0240665 A1* | 8/2015 | Stapp | F01K 3/18 |
| | | | 60/682 |
| 2016/0047361 A1* | 2/2016 | Al-Sulaiman | F01K 23/02 |
| | | | 60/641.15 |

OTHER PUBLICATIONS

Sarkar et al., "Optimization of recompression S-CO2 power cycle with reheating", Energy Conversion and Management, Science direct, vol. 50, Issue 8, 2009, pp. 1939-1945.

Yoon et al., "Potential advantages of coupling supercritical CO2 Brayton cycle to water cooled small and medium size reactor", Nuclear Engineering and Design, Science direct, vol. 245, 2012, pp. 223-232.

Michael J Hexemer.,"Supercritical CO2 Brayton Recompression Cycle Design and Control Features to Support Startup and Operation",The 4th International Symposium—Supercritical CO2 Power Cycles Technologies for Transformational Energy Conversion Sep. 9-10, 2014, Pittsburgh, Pennsylvania, 16 Pages.

* cited by examiner

REGENERATIVE THERMODYNAMIC POWER GENERATION CYCLE SYSTEMS, AND METHODS FOR OPERATING THEREOF

BACKGROUND

Embodiments of the invention generally relate to regenerative thermodynamic cycles, e.g., regenerative Brayton cycles, and more particularly to power generation systems e.g., gas turbine power plants, leveraging the regenerative Brayton cycles and methods for operating the systems.

Regenerative thermodynamic cycles are typically implemented to gas turbines and micro-turbines to improve the cycle (e.g., Brayton cycle) efficiency beyond what is otherwise achievable with a simple cycle machine. In current regenerative gas turbine cycles, a partial replacement of the fuel energy is achieved by regeneratively transferring energy from the exhaust gases via heat exchangers to the air discharging from the compressor. The compression ratio in such a machine is low enough that the temperature of the exhaust gas leaving the turbine and entering the regenerator is higher than the compressor discharge air to be heated therein. A substantial improvement in the efficiency of the gas turbine cycle has been realized.

Further improvements to these gas turbine cycles have been achieved by using various processes and configurations, for example, multistage compression with intercooling, multistage expansion with reheating, and recompression. However, even in such recuperated and recompression cycles, the thermal efficiency is limited by the fact that the temperature of the turbine exhaust gas can never be reduced below that of the compressor discharge air, or else the heat will flow in a reverse direction (to the exhaust gases), decreasing the efficiency of the system.

More recently, there has been an increased interest in using supercritical fluids, such as supercritical carbon dioxide, in closed thermodynamic power generation cycles. For example, a supercritical Brayton cycle power generation system offers a promising approach for achieving a higher efficiency and more cost-effective power conversion when compared to the existing steam-driven power plants and gas turbine power plants. However, the turbomachinery designs for such a power generation system are complex and challenging mainly because of (i) a large number of components required/used in the system, and (ii) the high fluid density of the supercritical fluid. In particular, it may be challenging to match the fluid flow and the speed of the expander and the compressor such that the mechanical design is optimized to minimize stresses and the net axial thrust loads, and also to ensure controllable operation at off-design conditions.

Therefore, alternative configurations for the regenerative thermodynamic cycles are desirable, which provide advantages over conventional thermodynamic power generation cycles, typically, used in the power generation systems.

BRIEF DESCRIPTION

One embodiment provides a method for operating a regenerative closed loop thermodynamic power generation cycle system. The method includes delivering an exhaust stream from a high-pressure expander and splitting the exhaust stream from the high-pressure expander to a first exhaust stream and a second exhaust stream. The first exhaust stream is directed to a first low-pressure expander that is coupled to a pressurization device through a turbocompressor shaft 122. The second exhaust stream is directed to a second low-pressure expander that is coupled to the high-pressure expander and an electrical generator through a turbogenerator shaft 118.

Another embodiment provides a regenerative closed loop thermodynamic power generation cycle system. The system includes a high-pressure expander to deliver an exhaust stream. A conduit is fluidly coupled to the high-pressure expander, which is configured to split the exhaust stream from the high-pressure expander into a first exhaust stream and a second exhaust stream. The system further includes a first low-pressure expander and a second low-pressure expander. The first low-pressure expander is coupled to a pressurization device through a turbocompressor shaft, and fluidly coupled to receive the first exhaust stream 112. The second low-pressure expander is coupled to the high-pressure expander and an electrical generator through a turbogenerator shaft 118, and fluidly coupled to receive the second exhaust stream.

DRAWINGS

These and other features, aspects, and advantages of the present invention will become better understood when the following detailed description is read with reference to the accompanying drawings, wherein.

DETAILED DESCRIPTION

In the following specification and the claims, which follow, a reference will be made to a number of terms, which shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value.

Figure 1:
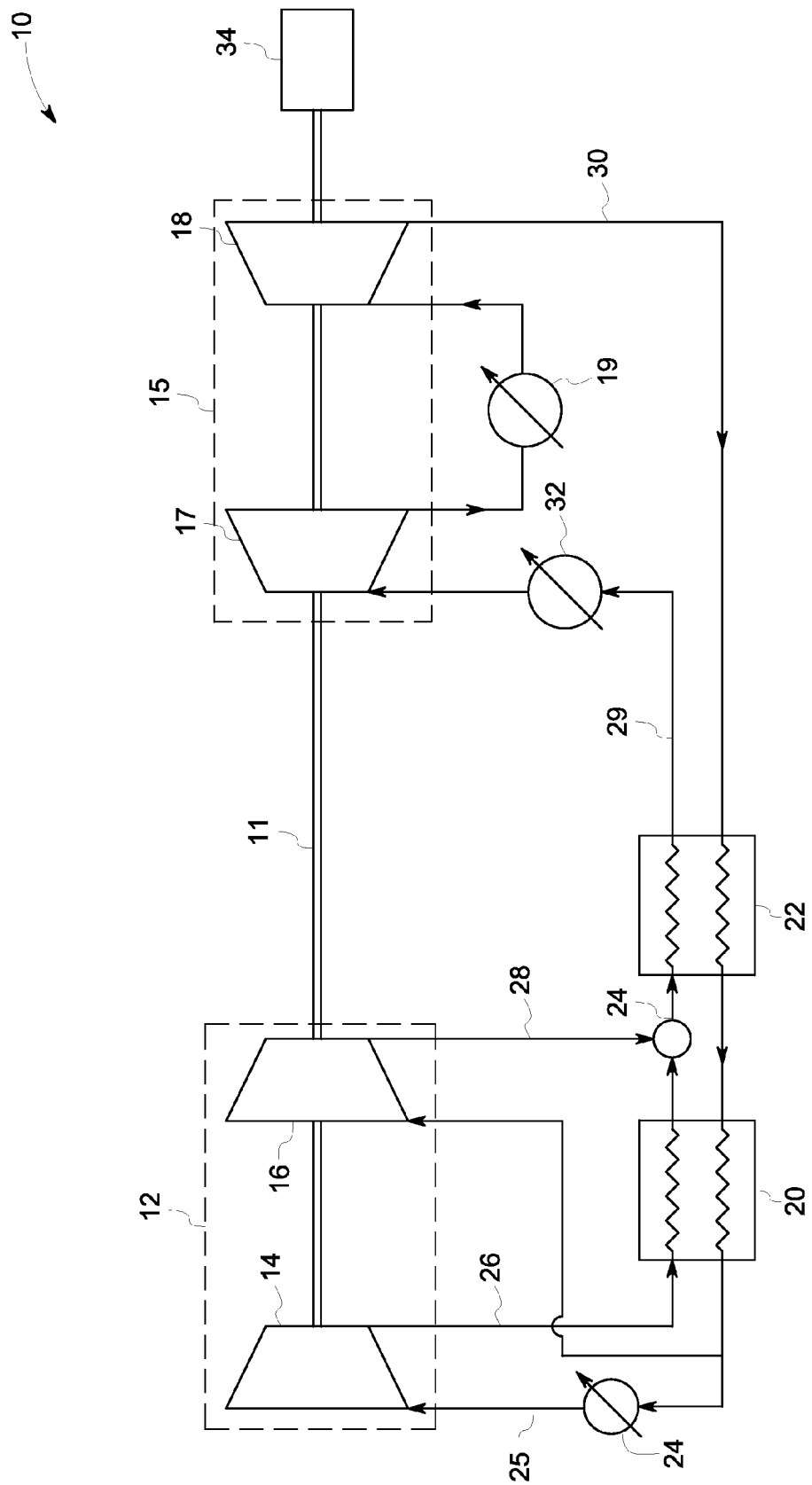
FIG. 1 is schematic diagram of a conventional regenerative closed loop Brayton cycle power generation system.

FIG. 1 illustrates a conventional regenerative closed loop Brayton cycle power generation system 10 using recompression and reheating configuration. The term "closed loop", as used herein, means that the system 10 forms a closed cycle flow path for a working fluid (that may also be referred to as "fluid" throughout the description). The working fluid that is compressed by one or more compressors 12 (usually, includes a main compressor 14 and a recompressor 16), follows the following closed cycle flow path inside the system 10. From the one or more compressors 12, the compressed fluid stream 26 enters a first heat exchanger 20, a second heat exchanger 22, a heat source 32, an expander 15, re-enters the second heat exchanger 22 and the first heat exchanger 20, a precooler 24, and returns to the one or more compressors 12. Thus the working fluid flows in this closed cycle flow path, and does not mix with the ambient or other fluids. The expander 15 may be a multistage expander that includes at least two expanders 17 and 18 along with an additional heat source 19 between the two expanders for reheating.

A suitable example of the working fluid includes carbon dioxide ($CO_2$). Other examples of working fluid include air, water, helium, or organic fluids, e.g., isobutene, propane etc. In some instances, the working fluid is a supercritical fluid e.g., supercritical carbon dioxide, and the system 10 is referred to a supercritical Brayton cycle power generation system.

A supercritical Brayton cycle power generation system is a power conversion system that uses a supercritical working fluid (or supercritical fluid). As used herein, the term "supercritical fluid" refers to a single-phase fluid in which distinct liquid and gaseous phases do not exist at or above a critical point (a critical temperature and a critical pressure) of the fluid. The term "critical point" of a supercritical fluid refers to a lowest temperature and a lowest pressure at which the substance exists in the supercritical state. The terms "critical temperature and "critical pressure" respectively refer to the temperature and the pressure at the critical point of the supercritical fluid.

Typically, a heat rejection in a supercritical Brayton cycle power generation system occurs when the working fluid conditions are above the critical temperature and the critical pressure of the fluid. In general, a highest cycle efficiency in a supercritical Brayton cycle system occurs when the temperature and the pressure of the working fluid at an inlet of a main compressor of such a generation system is as near to the critical point of the working fluid as possible.

As described herein, in the regenerative thermodynamic cycles (FIG. 1), a partial replacement of an external thermal energy (generally provided by a heat source 32) is achieved by transferring a fraction of a thermal energy recovered from an exhaust stream 30 from the expanders 15 to the compressed fluid streams (26, 28). This transfer of the fraction of the thermal energy increases the temperature of the compressed fluid streams (26, 28) after the fluid streams 26 and 28 leave the compressor 12, and before entering the expanders 15. The remaining exhaust energy is exhausted from the expander 15. A heat source 32 is additionally used to further heat the fluid stream 29 before entering the expander 15. The expanders 15 (may also be referred to as power turbines) are generally coupled to a generator 34 for producing electricity. This whole system including the one or more compressors 12, the expanders 17 and 18, and the generator 34, is usually arranged on a same shaft 11, as shown in FIG. 1.

Aspects of the present invention described herein address the noted shortcomings of the state of the art, and further improves the performance of disclosed thermodynamic power generation cycle system as compared to the conventional thermodynamic power generation cycle systems. Embodiments of the present invention are directed to an alternative configuration for a regenerative thermodynamic power generation cycle e.g., a supercritical $CO_2$ Brayton cycle. Some embodiments of the invention describe systems and processes for operating the systems including the disclosed thermodynamic power generation cycle.

Specifically, embodiments of the present invention are directed to a regenerative thermodynamic cycle permitting splitting an exhaust fluid stream (or exhaust stream) from a high-temperature expander into a first exhaust stream and a second exhaust stream after reheating the exhaust stream. The system includes two separate shafts: a turbocompressor shaft including a compressor or compressors and a turbogenerator shaft including the high-pressure expander and a generator. Each shaft further includes a low-pressure expander that is in fluid communication with the high-pressure expander to receive the first exhaust stream or the second exhaust stream. This configuration or design (as discussed in detail below) advantageously (i) creates a balanced net axial thrust on each of the two shafts, (ii) provides a desirable amount of the fluid flow to the low-pressure expander arranged on the turbocompressor shaft to drive the compressor(s), and (iii) splits the flow of the exhaust stream into two parallel expanders (e.g., the two low-pressure expanders), thereby reducing the airfoil aerodynamic loadings and mechanical stresses on the two expanders.

It should be understood that the process and the system of the present invention are not limited to the above example cycle configuration, but may be applicable to other cycle configurations, e.g., simple regenerative Brayton cycle, and Rankine cycle and supercritical Rankine cycle, where the working fluid is condensed before the compression.

Figure 2:
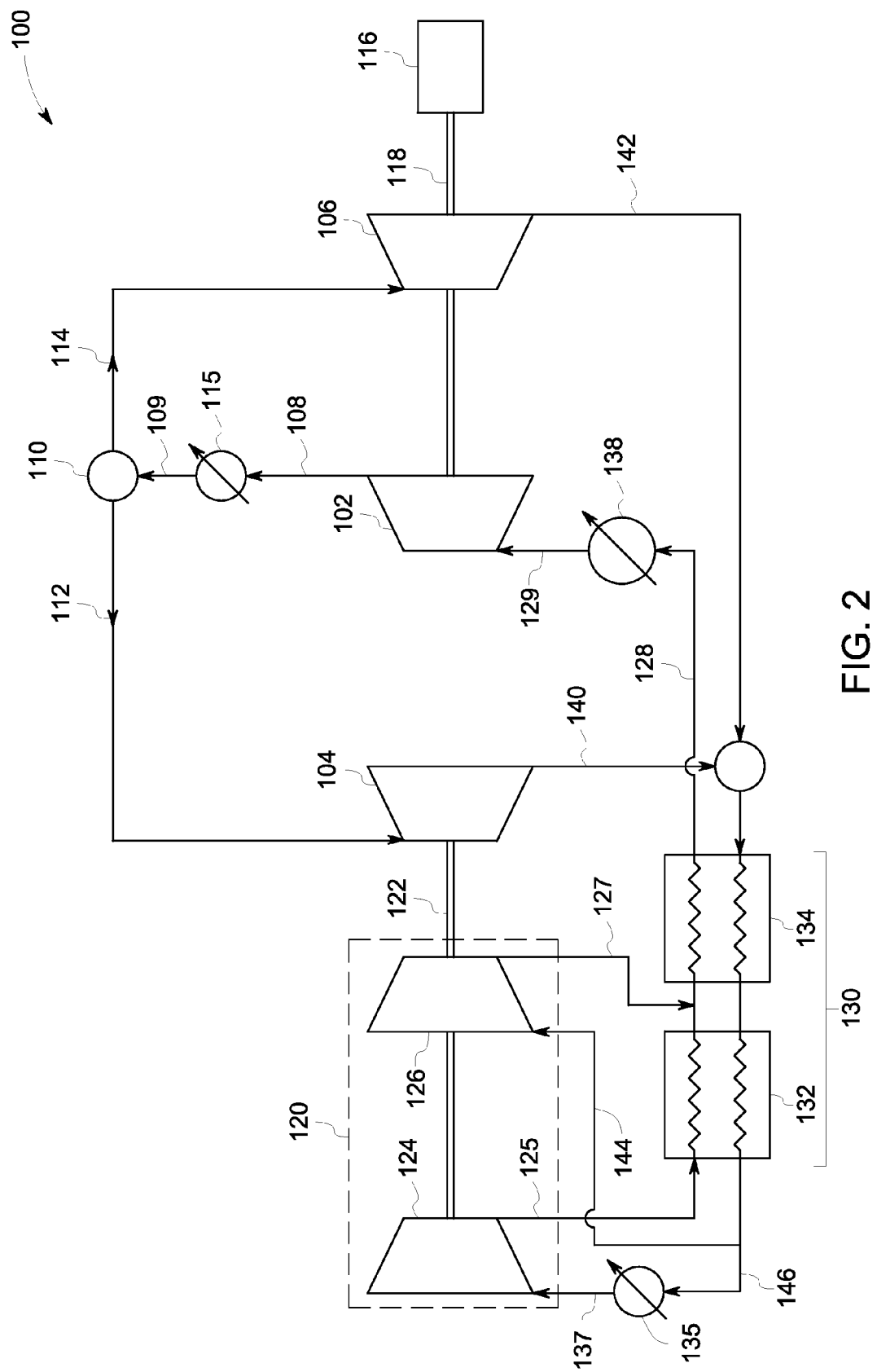
FIG. 2 is a schematic diagram of a regenerative closed loop Brayton cycle power generation system, in accordance to one embodiment of the invention.

FIG. 2 illustrates a regenerative closed loop thermodynamic cycle system 100, according to the embodiments of the invention. In one embodiment, the system 100 is a power generation system. In some specific embodiments, the system 100 represents a supercritical Brayton cycle power generation system. In some other embodiments, the system 100 represents a supercritical Rankine cycle power generation system. In these embodiments, the system 100 uses a working fluid with a relatively low temperature and low pressure, e.g., in the liquid state, that can be compressed directly to its supercritical pressure and heated to its supercritical state before the expansion.

In some embodiments, the system 100 includes a supercritical working fluid, such as supercritical carbon dioxide flowing in the closed cycle flow path. The critical temperature and the critical pressure for $CO_2$ are about 304° K and 7.3 MPa. In some instances, the working fluid may be a mixture of $CO_2$ and at least an additive, e.g., an alkane, neon, nitrogen, helium etc. The mixture can be selected to cause the critical temperature of the fluid to be at a desired temperature, which can be selected based at least, in part, upon an environment around the system, for example the ambient temperature, the day/night temperature range, the humidity proximate to the system, and the seasonal temperature etc.

The system 100 includes a high-pressure expander 102 and two low-pressure expanders: a first low-pressure expander 104 and a second low-pressure expander 106. Each of the two low-pressure expanders 104 and 106 are respectively arranged on a turbocompressor shaft 122 and a turbogenerator shaft 118. The turbocompressor shaft 122 further includes a pressurization device 120 that is coupled to the first low-pressure expander 104 through the shaft 122. The turbogenerator shaft 118 further includes the high-pressure expander 102 and a generator 116 that are coupled to the second low-pressure expander 106 through the turbogenerator shaft 118. That is, in the illustrated embodiment, the two low-pressure expanders 104 and 106 are in parallel arrangement.

As used herein, a high-pressure expander and a low-pressure expander are defined relative to each other. The operating pressure ranges i.e., the pressure ranges of a working fluid, at an inlet and an outlet of the low-pressure expander, are lower than the operating pressure ranges i.e., the pressure ranges of the working fluid at an inlet and an outlet of the high-pressure expander. In some instances, the high-pressure expander operates above the critical pressure of the working fluid, for example between about 100 bar and about 300 bar; and the low-pressure expander operates below the operating pressure range of the high-pressure expander, for example between about 30 bar and about 200 bar.

Initially, a working fluid stream 137 is supplied to the pressurization device 120. The fluid stream 137 includes a supercritical fluid, e.g., supercritical carbon dioxide. In some embodiments, the pressurization device 120 includes one or more compressors, which may be an axial, a radial or a reciprocating type. Preferably, the supercritical fluid stream 137 enters an inlet (not shown) of a first compressor 124 after the fluid has been expanded and cooled (as discussed below) to a temperature and a pressure that are near to the critical temperature and the critical pressure of the fluid, and the first compressor 124 compresses such fluid stream 137. The inlet of the first compressor 124 is fluidly coupled to the outlets of each of the first low-pressure expander 104 and the second low-pressure expander 106 such that a third exhaust stream 140 and a fourth exhaust stream 142 are directed to the inlet of the first compressor 124 through a precooler 135. After compression, a pressurized (i.e., compressed) and cooled fluid stream 125 exits the compressor 124.

The pressurization device 120 may further include a second compressor 126 that is coupled to the first compressor 124 through the turbocompressor shaft 122. The second compressor 126 may also be referred to as a recompressor. The recompressor is usually used to compress a fraction of an exhaust fluid stream before the thermal energy is removed by a precooler. The second compressor 126 is fluidly coupled to each of the first and the second low-pressure expanders 104 and 106 such as to receive a fluid stream 144 (at a relatively high temperature than the fluid stream 137). The fluid stream 144 includes the outputs of the first low-pressure expander 104 and the second low-pressure expander 106 i.e., the third exhaust stream 140 and the fourth exhaust stream 142. After compression, the second compressor 126 delivers a compressed fluid stream 127 that is usually at a relatively higher temperature than the compressed fluid stream 125 delivered by the first compressor 124.

In some other embodiments, for example, in a Rankine cycle or a supercritical Rankine cycle, the pressurization device 120 includes a pump and a condenser. In these embodiments, the working fluid stream 137 is supplied to the pressurization device 120 below its critical pressure and critical temperature, i.e., in its liquid state. In some embodiments, the pressurization device 120 delivers the pressurized fluid stream at a temperature and a pressure above the critical point of the fluid.

Referring to FIG. 2, the one or more compressors 120 are fluidly coupled to the high-pressure expander 102 to supply the compressed fluid streams 125 and 127 to the high-pressure expander 102. As illustrated, the one or more compressors 120 are fluidly coupled to the high-pressure expander 102 through one or more heat exchangers 130. The one or more heat exchangers 130 are further fluidly coupled to each of the first and the second low-pressure expanders 104 and 106 to receive the third exhaust stream 140 from the first low-pressure expander 104 and the fourth exhaust stream 142 from the second low-pressure expander 106. In one embodiment, the system 100 includes a first heat exchanger 132 and a second heat exchanger 134. The first heat exchanger 132 is configured to transfer heat from the third and the fourth exhaust streams 140 and 142 to the compressed fluid stream 125 i.e., the output of the first compressor 124, thereby increasing the temperature of the compressed fluid stream 125.

The second heat exchanger 134 may be a high temperature recuperator. The second heat exchanger 134 is configured to transfer heat from the third and the fourth exhaust streams 140 and 142 to a combination of the compressed fluid stream 125 from the first compressor 124 after passing through the first heat exchanger 132 and the compressed fluid stream 127 from the second compressor 126. This causes the temperature of the combined compressed fluid stream 128 to be further increased prior to being received at a first heat source 138, thereby reducing an amount of energy utilized by the first heat source 138 to cause the temperature of the fluid to be suitable for the provision to the high-temperature expander 102.

On the other hand, the first heat exchanger 132 and the second heat exchanger 134 reduce the temperature i.e., cool the third and the fourth exhaust streams 140 and 142 from the low-pressure expanders 104 and 106 prior to the fluid streams 144 and 146 being received at the precooler 135 and/or the recompressor 126.

The first heat source 138 is fluidly coupled between the one or more heat exchangers 130 and the high-pressure expander 102, and is configured to provide thermal energy to the combined compressed fluid stream 128 that includes compressed fluid streams 125 and 127, and to deliver a heated compressed fluid stream 129.

The heated compressed fluid stream 129 received from the first heat source 138 is supplied to an inlet of the high-pressure expander 102 such that the heated compressed fluid stream 129 expands due to the thermal energy provided by the first heat source 138, and drives the expander 102. After expansion, an exhaust stream 108 i.e., the output fluid stream of the expander 102 remains at a high temperature but has a lower pressure than the fluid stream 129 received at the inlet of the expander 102.

As illustrated, the exhaust stream 108 is directed to a conduit 110. The conduit 110 is fluidly coupled to the high-pressure expander 102, and configured to split the exhaust stream 108 into a first exhaust stream 112 and a second exhaust stream 114. Before splitting, the exhaust stream 108 is subjected to a second heat source 115. The second heat source 115 is fluidly coupled between the high-pressure expander 102 and the conduit 110 to receive the exhaust stream 108 from the expander 102 and deliver a heated exhaust stream 109 to the conduit 110. Thus, the temperature of each of the first and second exhaust streams 112 and 114 is higher than the exhaust stream 108 because of reheating the exhaust stream 108 by the second heat source 115.

In one embodiment, a pressure regulating valve (not shown) is arranged in the system 100 to control a flow ratio of the first exhaust stream 112 to the second exhaust stream 114. In one embodiment, the pressure regulating valve is a three-way valve that can be arranged at the conduit 110. In another embodiment, the pressure regulating valve is a throttling valve operating solely on either the first exhaust stream 112 or the second exhaust stream 114. By controlling the flow ratio, a desired flow of the first exhaust stream 112 may be supplied to the first low-pressure expander 104 to drive the turbocompressor shaft 122 to achieve enhanced performance of the one or more compressors 120. The enhanced performance of the compressors may improve the overall efficiency of the system 100. In one embodiment, the flow ratio ranges from about 30:70 to about 70:30. The flow ratio at the nominal design operating conditions is maintained so as to match the shaft power generated by the first low-pressure expander 104 with a desired shaft power required to operate one or more compressors 120. In one particular embodiment, the flow ratio is maintained at about 50:50.

Each of the first heat source 138 and the second heat source 115 may be any suitable heat source including, but not limited to, a fossil fuel heat source, a nuclear heat source, a geothermal heat source, a solar thermal heat source, or the likes.

As used herein, a heat exchanger e.g., the first heat exchanger 132 and the second heat exchanger 134 in FIG. 2, is configured to exchange heat between two fluid streams without bringing the two fluid streams in contact i.e., without combining the two fluid streams. This exchange or transfer of heat is generally known as indirect heating. The heat exchanger is distinguished from a heat source, as used herein, which is an external source of heat.

As illustrated, after splitting the heated exhaust streams: the first exhaust stream 112 and the second exhaust stream 114, are respectively directed to the first low-pressure expander 104 and the second low-pressure expander 106 to further expand, and thus drive the respective expanders, and respective shafts. The output streams i.e. the third exhaust stream 140 from the first low-pressure expander 104 and the fourth exhaust stream 142 from the second low-pressure expander 106 are combined, and a fraction of the combined stream i.e., the stream 146 is directed to the precooler 135. The precooler 135 is further fluidly coupled to the pressurization device 120 to supply the cooled and expanded fluid stream 137 to the pressurization device 120.

In one embodiment, the precooler 135 includes a heat rejecter that rejects heat near the critical temperature of the fluid. The precooler 135 may include any suitable heat rejecter, such as a liquid cooling system, a dry cooling system or the likes.

As used herein, the term "near" refers to a value that can be within at least 1% of the precise value specified. In an example, "near the critical point of the fluid" or "near the critical temperature of the fluid" refers to a temperature, a pressure, or both that can be within 1% of the critical point of the fluid. In some embodiments, a temperature, a pressure or both can be within 5% and, in some embodiments, within 10% of the critical point of the fluid. In another example, "near the critical temperature of the fluid" refers to a temperature that can be within 3 degree Kelvin of the critical temperature of the fluid. In some embodiments, the temperature can be within 15 degrees Kelvin and, in some embodiments, within 10 degrees Kelvin of the critical temperature of the fluid.

A compressor and an expander, as used herein, can respectively include a multistage compressor and a multistage expander. As known in the art, the compression process can be carried out by compressing the working fluid in multiple stages, i.e., utilizing the multistage compression; and the expansion process can be carried out by expanding the working fluid in multiple stages, i.e., utilizing the multistage expansion. Furthermore, the multistage compression may be utilized with or without intercooling the fluid in between the stages; and the multistage expansion may be utilized with or without reheating the fluid in between the stages.

Splitting the exhaust stream 108 into the first exhaust stream 112 and the second exhaust stream 114 distributes the exhaust stream 108 to supply to the first and second low-pressure expanders 104 and 106. This distribution provides reduced amounts of the fluid flowing to the low-pressure expanders 104 and 106 with a higher pressure ratio than that can be achieved in a series arrangement of expanders. This flow arrangement advantageously leads to short airfoils of the expanders with a high stage count, low aerodynamic loadings on the airfoils, and low airfoil root bending stresses. Positioning the expanders 102 and 106 in the parallel arrangement enables balancing the net axial thrust, and can advantageously eliminate the need for a balance piston and its associated leakage. Furthermore, the flow ratio of the first exhaust stream 112 and the second exhaust stream 114 controls the speeds of the two shafts, separately. Typically, in a convention configuration that uses one shaft, the compressor rotation is restricted by the rotation speed of the expanders (may also be referred to as a power turbine), which usually limits the performance of the compressors. The present embodiments advantageously allow the rotation of two shafts with different speeds, in particular, the rotation of the turbocompressor shaft with a desirable speed to maximize the compressors' performance. Moreover, the efficiency of the system 100 is relatively high as compared to the existing regenerative Brayton cycle power generation systems.

As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method for operating a regenerative closed loop thermodynamic power generation cycle system, comprising:
   delivering an exhaust stream from a high-pressure expander;
   splitting the exhaust stream from the high-pressure expander to a first exhaust stream and a second exhaust stream;
   directing the first exhaust stream to a first low-pressure expander, wherein the first low-pressure expander is coupled to a pressurization device through a turbocompressor shaft;
   directing the second exhaust stream to a second low-pressure expander, wherein the second low-pressure expander is coupled to the high-pressure expander and an electrical generator through a turbogenerator shaft; and
   delivering a pressurized fluid stream above a critical point of a working fluid from the pressurization device and providing the pressurized fluid stream to the high-pressure expander.

2. The method of claim 1, further comprising heating the exhaust stream before splitting the exhaust stream to the first exhaust stream and the second exhaust stream.

3. The method of claim 1, further comprising heating the pressurized fluid stream before supplying the pressurized fluid stream to the high-pressure expander.

4. The method of claim 1, further comprising delivering a third exhaust stream from the first low-pressure expander and a fourth exhaust stream from the second low-pressure expander and regeneratively supplying each of the third exhaust stream and the fourth exhaust stream to one or more heat exchangers.

5. The method of claim 4, further comprising supplying the third exhaust stream and the fourth exhaust stream to a precooler through the one or more heat exchangers.

6. The method of claim 5, further comprising receiving a cooled fluid stream from the precooler to supply the cooled fluid stream to the pressurization device.

7. The method of claim 1, wherein splitting the exhaust stream from the high pressure expander comprises controlling a flow ratio of the first exhaust stream to the second exhaust stream.

8. A regenerative closed loop thermodynamic power generation cycle system, comprising:
   a high-pressure expander to deliver an exhaust stream,
   a conduit fluidly coupled to the high-pressure expander, and configured to split the exhaust stream into a first exhaust stream and a second exhaust stream;
   a first low-pressure expander coupled to a pressurization device through a turbocompressor shaft, and fluidly coupled to receive the first exhaust stream; and
   a second low-pressure expander coupled to the high-pressure expander and an electrical generator through a turbogenerator shaft, and fluidly coupled to receive the second exhaust stream, wherein the pressurization device is fluidly coupled to the high-pressure expander to supply a pressurized fluid stream above a critical point of a working fluid to the high-pressure expander.

9. The thermodynamic power generation cycle system of claim 8, wherein the thermodynamic power generation cycle system forms a closed flow path for the working fluid.

10. The thermodynamic power generation cycle system of claim 9, wherein the working fluid comprises carbon dioxide.

11. The thermodynamic power generation cycle system of claim 8, wherein the pressurization device comprises a first compressor and a second compressor coupled to each other.

12. The thermodynamic power generation cycle system of claim 8, wherein the pressurization device is fluidly coupled to the high-pressure expander through one or more heat exchangers.

13. The thermodynamic power generation cycle system of claim 12, wherein the one or more heat exchangers comprise a first heat exchanger and a second heat exchanger fluidly coupled to each other.

14. The thermodynamic power generation cycle system of claim 12, further comprising a first heat source fluidly coupled between the one or more heat exchangers and the high-pressure expander.

15. The thermodynamic power generation cycle system of claim 12, wherein the one or more heat exchangers are further fluidly coupled to the first low-pressure expander and the second low-pressure expander to receive a third exhaust stream and a fourth exhaust stream.

16. The thermodynamic power generation cycle system of claim 8, further comprising a second heat source fluidly coupled between the high-pressure expander and the conduit to receive the exhaust stream from the high-pressure expander and deliver a heated exhaust stream to the conduit.

17. The thermodynamic power generation cycle system of claim 8, further comprising a pressure regulating valve to control a flow ratio of the first exhaust stream to the second exhaust stream.

18. The thermodynamic power generation cycle system of claim 8, further comprising a precooler fluidly coupled to the pressurization device to supply a cooled fluid stream to the pressurization device.

* * * * *